(12) United States Patent
Suzuki et al.

(10) Patent No.: US 7,608,969 B2
(45) Date of Patent: Oct. 27, 2009

(54) STATOR FOR ROTARY ELECTRIC MACHINE

(75) Inventors: Kenta Suzuki, Yokohama (JP); Masaki Nakano, Yokohama (JP); Takashi Kato, Kanagawa (JP); Hisayuki Furuse, Kanagawa (JP); Tomoya Imazu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/229,578

(22) Filed: Sep. 20, 2005

(65) Prior Publication Data
US 2006/0061229 A1 Mar. 23, 2006

(30) Foreign Application Priority Data
Sep. 21, 2004 (JP) ............................. 2004-273379

(51) Int. Cl.
*H02K 1/06* (2006.01)
(52) U.S. Cl. .................. 310/217; 310/218; 310/268; 310/214; 310/254; 310/216
(58) Field of Classification Search ............... 310/259, 310/218, 217, 180–194, 216, 268, 215, 214, 310/254
See application file for complete search history.

(56) References Cited

U.S. PATENT DOCUMENTS

| | | | | |
|---|---|---|---|---|
| 1,756,672 A | * | 4/1930 | Barr | 310/259 |
| 5,969,455 A | * | 10/1999 | Sakamoto | 310/194 |
| 6,127,753 A | * | 10/2000 | Yamazaki et al. | 310/71 |
| 6,411,006 B2 | * | 6/2002 | Suzuki et al. | 310/254 |
| 6,509,665 B1 | * | 1/2003 | Nishiyama et al. | 310/215 |
| 2001/0005933 A1 | * | 7/2001 | Kazama et al. | 29/596 |
| 2002/0047473 A1 | * | 4/2002 | Laurent et al. | 310/254 |
| 2003/0006664 A1 | | 1/2003 | Eggers et al. | |
| 2004/0090137 A1 | | 5/2004 | Bildstein | |
| 2004/0124733 A1 | | 7/2004 | Yamamoto et al. | |
| 2004/0130229 A1 | * | 7/2004 | Akatsu et al. | 310/112 |
| 2004/0135461 A1 | * | 7/2004 | Miyake et al. | 310/258 |
| 2004/0232779 A1 | * | 11/2004 | Arimitsu et al. | 310/43 |

FOREIGN PATENT DOCUMENTS

EP   1 096 648 A2   5/2001
JP   2001-359261 A   12/2001

* cited by examiner

*Primary Examiner*—Quyen Leung
*Assistant Examiner*—Alex W Mok
(74) *Attorney, Agent, or Firm*—Foley & Lardner LLP

(57) ABSTRACT

A stator for a rotary electric machine, including a plurality of stator cores arranged in a circumferentially spaced relation about a central axis of the stator, and a molded resin filled between the adjacent stator cores. Each of the stator cores includes a meshing portion which is meshed with the molded resin and formed on circumferentially opposed side surfaces of the stator core. The stator core includes a plurality of stator segments laminated along a direction of the central axis so as to form the meshing portion.

20 Claims, 7 Drawing Sheets

STATOR FOR ROTARY ELECTRIC MACHINE

BACKGROUND OF THE INVENTION

The present invention relates to a stator for a multi-shaft multi-layer rotary electric machine, and specifically, relates to a stator for a rotary electric machine including two rotors and one stator common to the rotors.

Japanese Patent Application First Publication No. 2001-359261 describes a rotary electric machine including a cylindrical stator and inner and outer rotors rotatably disposed inside and outside the stator, respectively. The stator includes a plurality of stator cores with coils which are arranged in a circumferential direction thereof, and a molded resin filled between the adjacent stator cores.

SUMMARY OF THE INVENTION

In such a stator for the multi-shaft multi-layer rotary electric machine of the above-described related art, it is required to enhance a flexural rigidity in a radial direction and a circumferential direction of the stator cores per se. However, there has been proposed no technology of enhancing the flexural rigidity of the stator cores each made of laminated electromagnetic steel plates. In addition, since the stator structure includes the molded resin filled between the adjacent stator cores, the stator cores cannot be rigidly fixed by the molded resin in neither radial direction nor axial direction of the stator cores. Further, in a case where the stator suffers from heat generated therein due to iron loss and copper loss, there will occur a clearance between the stator cores and the molded resin which are different in coefficient of linear expansion from each other. The occurrence of a clearance causes deterioration of the restraining force of the molded resin.

It is an object of the present invention to solve the above-described problems and provide a stator for a multi-shaft multi-layer rotary electric machine, which is capable of enhancing flexural rigidity of stator cores and a restraining force of a molded resin relative to the stator cores.

In one aspect of the present invention, there is provided a stator for a rotary electric machine, comprising:
 a plurality of stator cores arranged in a circumferentially spaced relation about a central axis of the stator; and
 a molded resin filled between the adjacent stator cores,
 each of the plurality of stator cores including a meshing portion which is meshed with the molded resin and formed on circumferentially opposed side surfaces of the stator core, each of the plurality of stator cores including a plurality of stator segments laminated along a direction of the central axis so as to form the meshing portion.

In a further aspect of the present invention, there is provided a stator for a rotary electric machine, comprising:
 a plurality of stator cores arranged in a circumferentially spaced relation about a central axis of the stator; and
 a molded resin filled between the adjacent stator cores; and
 meshing means for preventing a relative movement between each of the plurality of stator cores and the molded resin in a predetermined direction.

DETAILED DESCRIPTION OF THE INVENTION

Figure 1:
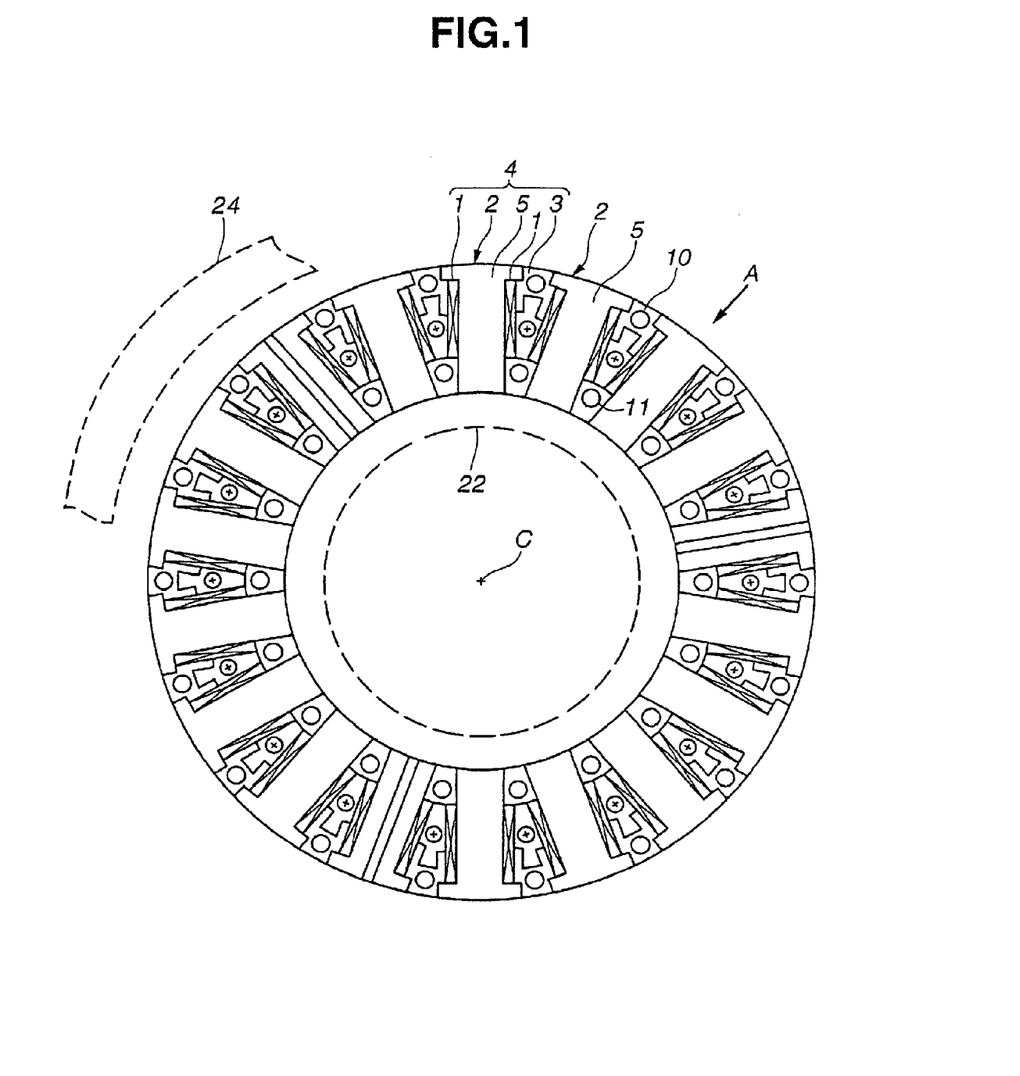
FIG. 1 is a schematic cross section of a stator for a multi-shaft multi-layer rotary electric machine, of a first embodiment according to the present invention, taken in a direction perpendicular to a central axis of the stator.
Figure 2:
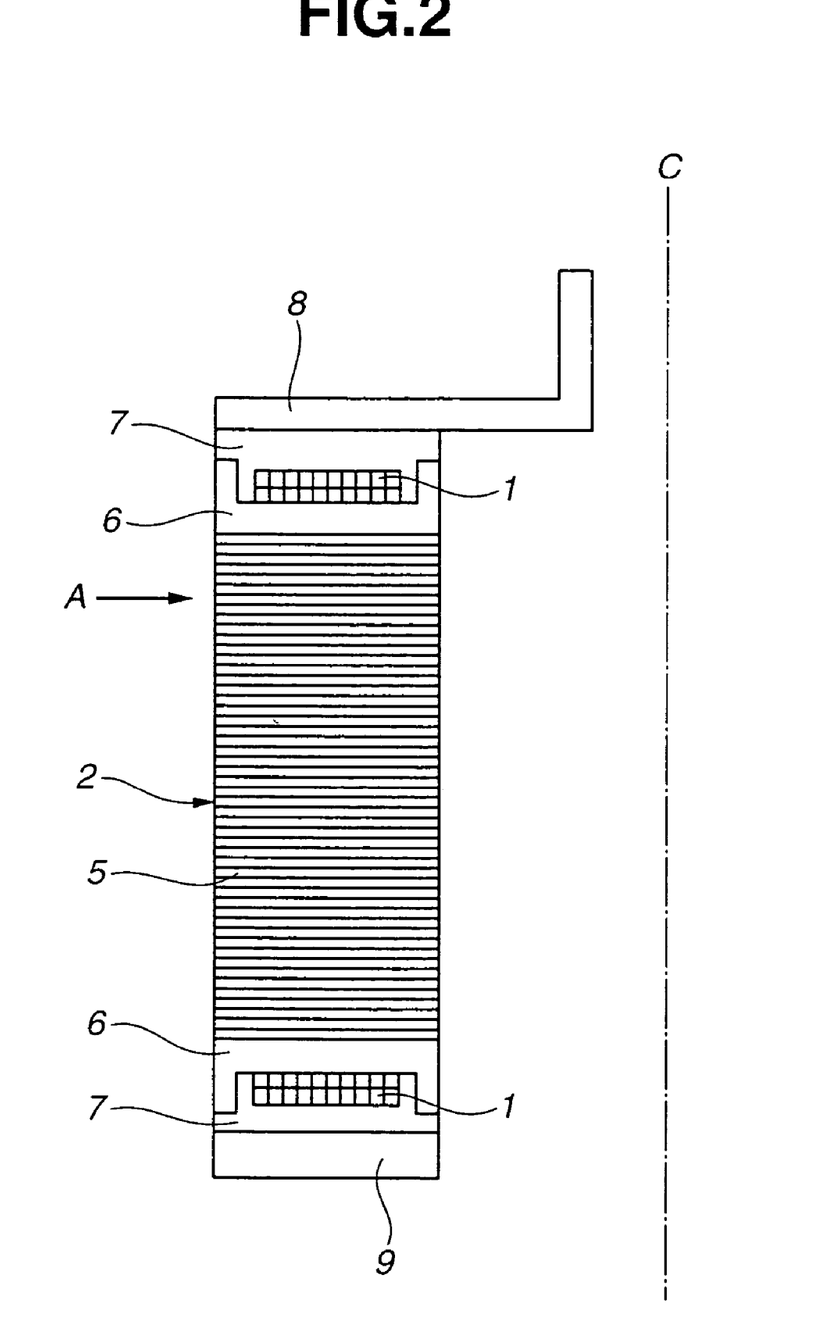
FIG. 2 is a schematic section of the stator as shown in FIG. 1, taken in a plane including the central axis of the stator.
Figure 3:
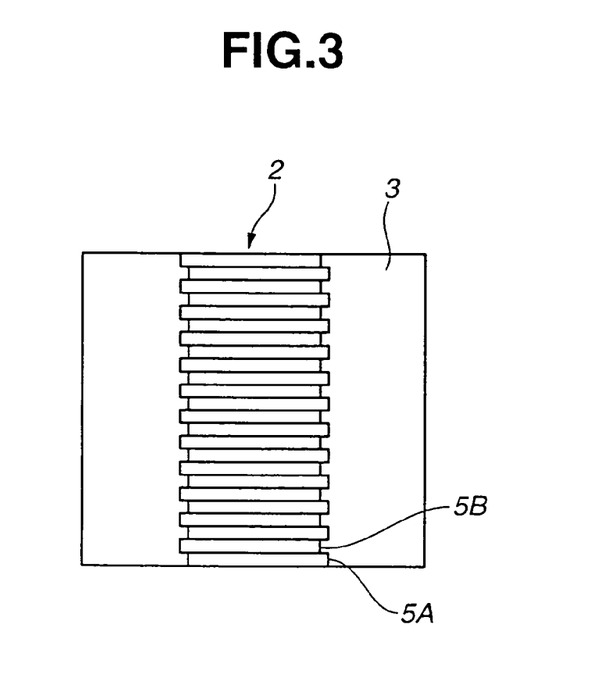
FIG. 3 is a schematic diagram of a stator core of the stator as viewed from direction A as shown in FIGS. 1 and 2, showing stator segments of the stator core and a molded resin.

In the following, embodiments of the present invention will be described with reference to the accompanying drawings. Referring to FIGS. 1-3, a stator of a first embodiment of the present invention which is used in a multi-shaft multi-layer rotary electric machine is explained. FIG. 1 is a schematic cross section of the stator of the first embodiment, taken in a direction perpendicular to central axis C of the stator. FIG. 2 is a schematic section of the stator of the first embodiment, taken in a plane containing central axis C of the stator. As illustrated in FIG. 1, stator 4 has an annular shape. Inner rotor 22 and outer rotor 24 (in dashed lines) are disposed inside and outside stator 4, respectively. Stator 4 is common to the inner and outer rotors and cooperates therewith to constitute the rotary electric machine.

As illustrated in FIG. 1, stator 4 includes a plurality of stator cores 2 arranged in a circumferentially spaced relation and molded resin 3 filled between adjacent stator cores 2. Each of stator cores 2 is in the form of a block having a T-shaped cross section as shown in FIG. 1, and carries coils 1 wound thereon. Stator core 2 includes a plurality of stator segments 5 laminated along a direction of central axis C of stator 4 so as to form a meshing portion on circumferentially opposed side surfaces of stator core 2 which is meshed with molded resin 3. The meshing portion will be explained in detail later with reference to FIG. 3. Each of stator segments 5 has a generally T-shape including a head portion located on the radial outside and a shank portion which is located on the radial inside and has a circumferential width smaller than that of the head portion. Stator segment 5 is made of an electromagnetic steel plate. Preferably, stator segment 5 is made of a silicon steel plate coated with an inorganic insulating film.

As illustrated in FIG. 2, insulators 6 are coupled to both ends of stator core 2 which are opposed to each other in the direction of central axis C of stator 4. Coils 1 are wound on stator core 2 so as to cover the circumferentially opposed side surfaces of stator core 2 and opposite end surfaces of insulator 6. Insulator covers 7 are fitted to end portions of respective insulators 6. Insulator covers 7 are formed into a shape to cover end portions of coils 1 which are opposed to each other in the direction of central axis C of stator 4. Stator core 2 is supported between front cover 8 and rear cover 9 by tightening bolts 10 and 11 shown in FIG. 1, and nuts, not shown.

FIG. 3 is a schematic diagram of stator 4 as viewed from radial direction A of stator 4 as shown in FIGS. 1 and 2. In FIG. 3, for the sake of simplicity, only stator core 2 and molded resin 3 are shown and the remaining parts are omitted. As illustrated in FIG. 3, stator core 2 is formed by two kinds of stator segments 5A and 5B alternately laminated along the direction of central axis C of stator 4 so as to form the meshing portion on the circumferentially opposed side surfaces of stator core 2 which is meshed with molded resin 3. Stator segments 5A and 5B may be configured to be different in at least one of shape and size from each other. In this embodiment, stator segments 5A and 5B have generally T-shape as viewed from the direction of central axis C but are not identical in the shape with each other. Specifically, head portions of the generally T-shape of stator segments 5A and 5B alternately laminated form recesses and projections which are alternately arranged in the direction of central axis C to form the meshing portion on the circumferentially opposed side surfaces of stator core 2 as shown in FIG. 3. Thus, the meshing portion on the side surfaces of stator core 2 is constituted of the recesses and the projections formed by the two kinds of stator segments 5A and 5B alternately laminated. No meshing portion is provided on end surfaces of stator core 2 which are opposed to each other in the direction of central axis C, and on outer and inner circumferential surfaces thereof. Molded resin 3 filled between adjacent stator cores 2 is in mesh with the meshing portion of the side surfaces of each of stator cores 2.

With the provision of the meshing portion on the circumferentially opposed side surfaces of each of stator cores 2, upon molding resin 3 between adjacent stator cores 2, resin 3 enters into the recesses present on the meshing portion of the side surfaces of stator core 2 to thereby enhance flexural rigidity of stator cores 2 in both the radial direction and the circumferential direction. Further, molded resin 3 is formed with a meshing surface meshed with the corresponding meshing portion of the side surfaces of stator core 2. The meshing surface of molded resin 3 is meshed with the corresponding meshing portion of the side surfaces of stator core 2 to thereby restrain relative movement between molded resin 3 and stator core 2 in the direction of central axis C. As a result, stator core 2 can be rigidly fixed in the direction of central axis C. Accordingly, even if there occurs a clearance between stator core 2 and molded resin 3 due to heat generated during an operation of the rotary electric machine, stator core 2 can be prevented from being displaced relative to molded resin 3 in the direction of central axis C. Further, the meshing portion of the side surfaces of stator core 2 has a so-called comb-shaped contour in mesh with molded resin 3 when viewed from the radial outside along an outer circumferential surface of stator 4 as shown in FIG. 3, or when viewed in section perpendicular to the radial direction and extending across the head portion of stator core 2. Owing to the comb-shape of the meshing portion, dispersion in magnetic attraction force produced between stator 4 and the rotors which is caused depending on the rotational positions of the rotors can be considerably reduced to thereby suppress so-called cogging torque which will be caused in the rotary electric machine.

Figure 4A:
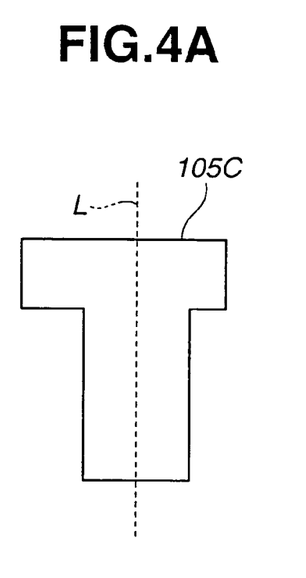
FIGS. 4A and 4B illustrate a second embodiment of the stator of the present invention, showing opposite end surfaces of a stator segment of a stator core, respectively, as viewed in a direction of the central axis of the stator.
Figure 4B:
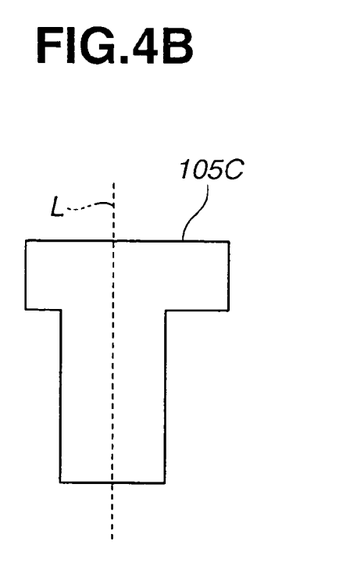

Referring to FIGS. 4A and 4B, a second embodiment of the stator of the present invention is explained. The second embodiment differs from the first embodiment in that stator core 2 is formed by laminated stator segments 105C which have a same shape asymmetrical with respect to a straight line extending parallel to a radial direction of stator core 2 and are arranged to be alternately turned over along the direction of central axis C. FIGS. 4A and 4B show opposite end surfaces of stator segment 105C when viewed from the direction of central axis C. As shown in FIGS. 4A and 4B, stator segment 105C has a deformed T-shape asymmetrical with respect to straight line L extending through the head portion and the shank portion in parallel relation to the radial direction of stator core 2. Stator segments 105C are alternately turned over such that opposite end surfaces as shown in FIGS. 4A and 4B are alternately arranged in the direction of central axis C. The head portions of the asymmetrical T-shaped stator segments 105C alternately turned over form recesses and projections which constitute the meshing portion on the circumferentially opposed side surfaces of stator core 2.

The second embodiment can exhibit the same effects as described in the first embodiment. In addition, in the second embodiment, stator segment 105C can be produced using a single die, serving for reducing the production cost and enhancing the production efficiency as compared to the first embodiment in which two types of dies are required in order to produce the two kinds of stator segments 5A and 5B.

The construction of stator core 2 is not limited to the above-described first and second embodiments, and may be modified to include same T-shaped stator segments which are alternately laminated along the direction of central axis C in a circumferentially offset relation to one another. Further, stator core 2 may be formed by two kinds of T-shaped stator segments different in circumferential width of the head portion and alternately laminated along the direction of central axis C.

Figure 5:
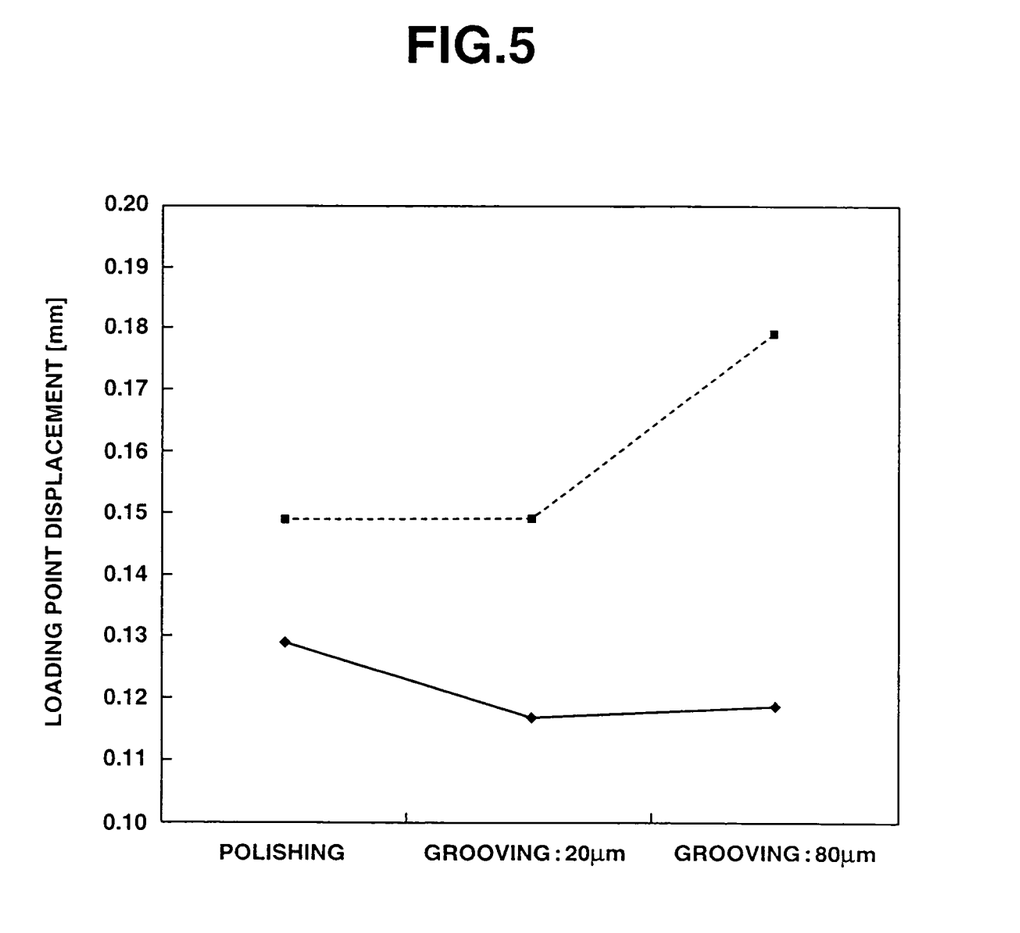
FIG. 5 is a graph illustrating results of a bending test from which the stator of the present invention is derived.

FIG. 5 shows results of a bending test of a bar-shaped metal test specimens, from which the present invention is derived. The bending test was conducted using six kinds of test specimens. The test specimens were prepared from a bar made of steel S45C in the following manner. A first kind of test specimen was prepared by polishing a surface of the bar. A second kind of test specimen was prepared by polishing the surface of the bar and subjecting the bar to grooving to form grooves on the surface which extended perpendicular to a longitudinal direction thereof and had a width of 20 μm, a depth of 20 μm and a pitch of 0.27 mm. A third kind of test specimen was prepared by polishing the surface of the bar and subjecting the bar to grooving to form grooves on the surface which extended perpendicular to a longitudinal direction thereof and had a width of 80 μm, a depth of 80 μm and a pitch of 0.27 mm. A fourth kind of test specimen was prepared by polishing the surface of the bar and subjecting the bar to molding to form a molded resin layer on the surface. A fifth kind of test specimen was prepared by subjecting the bar to polishing and grooving in the same manner as described in the second kind of test specimen, and subjecting the bar to resin molding to form a molded resin layer on the surface. A sixth kind of test specimen was prepared by subjecting the bar to polishing and grooving in the same manner as described in the third kind of test specimen, and subjecting the bar to resin molding to form a molded resin layer on the surface. The thus-prepared test specimens were subjected to the following bending test. Each of the test specimens was supported at two points spaced from each other at an interval of 60 mm. Load of 30N was applied to the respective test specimens at a midpoint between the two points, and displacement of the loading point was measured. The displacement amounts of the loading point in the first through third kinds of test specimens were 0.149 mm, 0.149 mm and 0.179 mm, respectively. The displacement amounts of the loading point in the fourth through sixth kinds of test specimens were 0.129 mm, 0.117 mm and 0.119 mm, respectively. FIG. 5 shows the measurement results in the bending test. In FIG. 5, the measurement results of the first through third kinds of test specimens are indicated by broken line, and the measurement results of the fourth through sixth kinds of test specimens are indicated by solid line.

In the first kind of test specimen without grooves and the second and third kinds of test specimens with grooves, the followings were recognized. The second kind of test specimen had the same displacement amount of the loading point as that of the first kind of test specimen. In the second and third kinds of test specimens, as the groove width became larger, the displacement amount of the loading point was increased. Therefore, in the second and third kinds of test specimens, as the groove width was increased, the flexural rigidity was reduced. On the other hand, in the fourth kind of test specimen without groove and with the molded resin layer, the displacement amount of the loading point was reduced, and therefore, the flexural rigidity was increased, as compared to the first through third kinds of test specimens. In the fifth and sixth kinds of test specimens with the grooves and the molded resin layer, the displacement amount of the loading point was reduced, and therefore, the flexural rigidity was increased, as compared to the fourth kind of test specimen. As a result, it was understood that the bar-shaped metal member tended to be enhanced in flexural rigidity by subjecting to grooving and resin molding.

From the above findings, it is considered that a stator core has the same tendency as that of the bar-shaped metal member. Accordingly, it is understood that if stator segments are laminated so as to form a meshing portion on the side surfaces of the stator core and a molded resin is filled between adjacent stator cores, the stator core can be enhanced in flexural rigidity. The present invention has been achieved on the basis of this finding.

Figure 6A:
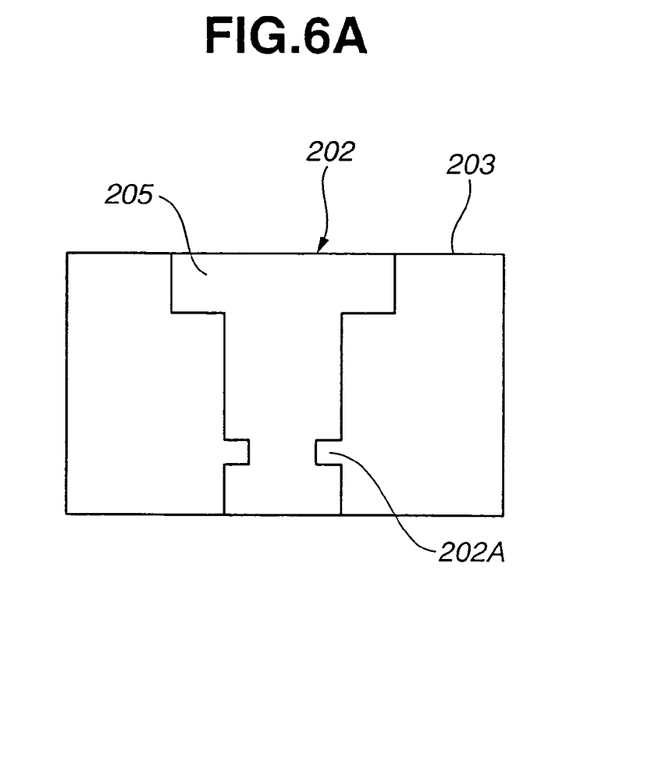
FIGS. 6A and 6B illustrate a third embodiment of the stator of the present invention and a modification of the third embodiment, respectively.

Referring to FIG. 6A, a third embodiment of the stator of the present invention is explained, which differs from the first embodiment in configuration of the stator core and the molded resin. FIG. 6A is a schematic cross section of the stator, taken in a plane perpendicular to central axis C, and shows only stator core 202 and molded resin 203 for the sake of simplicity. Stator core 202 having a generally T-shaped section includes a head portion located on the radial outside and a shank portion which is located on the radial inside and has a circumferential width smaller than that of the head portion. Recess 202A is in the form of a groove provided on a radially inner side of opposed side surfaces of the shank portion of stator core 202. Recess 202A continuously extends in the direction of central axis C of the stator between opposite axial end surfaces of stator core 202. Namely, recesses 202A are formed on a radially inner side of circumferentially opposed side surfaces of the shank portion of respective stator segments 205 laminated in the direction of central axis C. Recesses 202A are in alignment with one another in the direction of central axis C. Molded resin 203 is filled between adjacent stator cores 202 and formed with a projection meshed with recess 202A of stator core 202. Thus, recess 202A forms the meshing portion on the circumferentially opposed side surfaces of stator core 202 which is meshed with the projection of molded resin 203. Owing to the meshing between recess 202A of stator core 202 and the projection of molded resin 203, stator core 202 can be radially fixed and prevented from being radially displaced relative to molded resin 203.

Figure 6B:
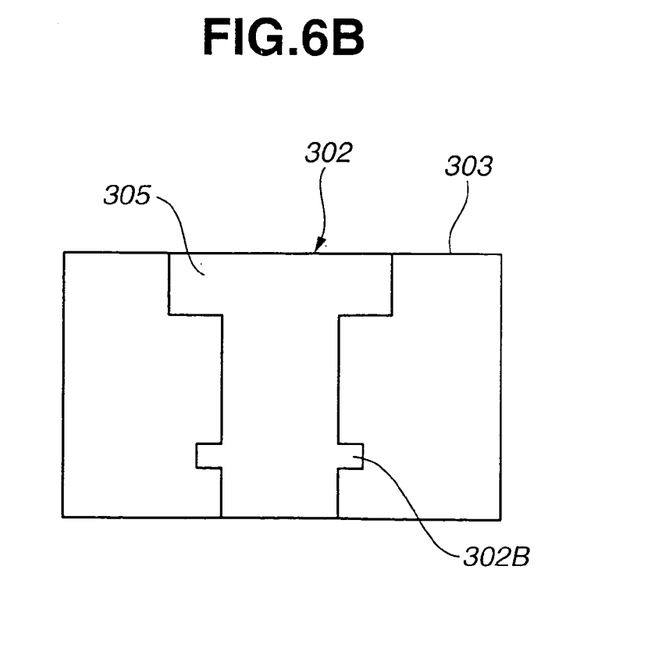

FIG. 6B illustrates a modification of the third embodiment in which projection 302B is provided on a radially inner side of opposed side surfaces of the shank portion of stator core 302 and forms the meshing portion on the side surfaces of stator core 302. Projection 302B continuously extends in the direction of central axis C of the stator between opposite axial end surfaces of stator core 302. Specifically, projections 302B are formed on a radially inner side of circumferentially opposed side surfaces of the shank portion of respective stator segments 305 laminated in the direction of central axis C. Projections 302B are in alignment with one another in the direction of central axis C. Molded resin 303 is filled between adjacent stator cores 302 and formed with a recess meshed with projection 302B of stator core 302. Owing to the meshing between projection 302B of stator core 302 and the recess of molded resin 303, stator core 302 can be radially fixed and prevented from being radially displaced relative to molded resin 303. Further, since stator core 302 acts as a magnetic path, projection 302B is preferred to a recess in order to provide a wider magnetic path.

Figure 7A:
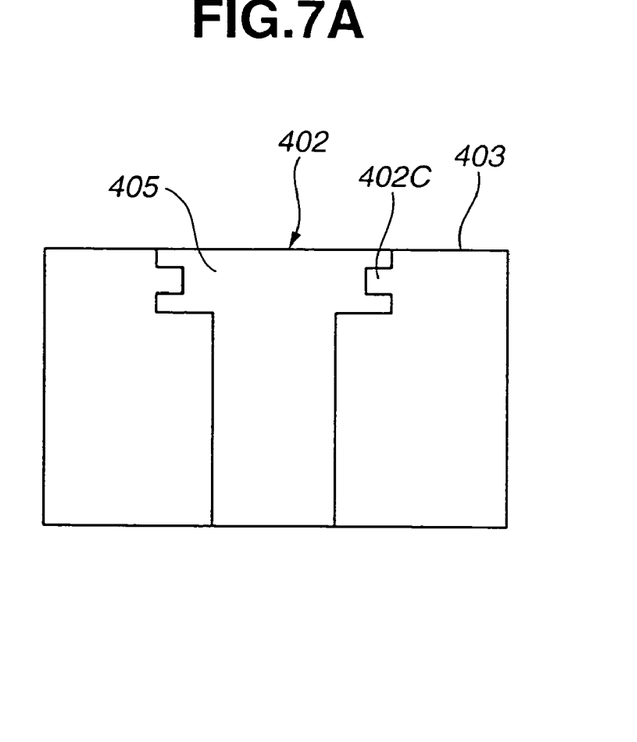
FIGS. 7A and 7B illustrate a fourth embodiment of the stator of the present invention and a modification of the fourth embodiment, respectively.

Referring to FIG. 7A, a fourth embodiment of the stator of the present invention is explained, which differs in configuration of the stator core and the molded resin from the first embodiment. FIG. 7A is a schematic cross section of the stator, taken in a plane perpendicular to central axis C, and shows only stator core 402 and molded resin 403 for the sake of simplicity. Stator core 402 having a generally T-shaped section includes a head portion located on the radial outside and a shank portion located on the radial inside and having a circumferential width smaller than that of the head portion. Recess 402C is in the form of a groove provided on opposed side surfaces of the head portion of stator core 402 and forms the meshing portion on the side surfaces thereof which is meshed with molded resin 403 filled between adjacent stator cores 402. Recess 402C continuously extends in the direction of central axis C of the stator between opposite axial end surfaces of stator core 402. Specifically, recesses 402C are formed on circumferentially opposed side surfaces of the head portion of respective stator segments 405 laminated in the direction of central axis C. Recesses 402C are in alignment with one another in the direction of central axis C. Molded resin 403 filled between adjacent stator cores 402 is formed with a projection meshed with recess 402C of stator core 402.

Figure 7B:
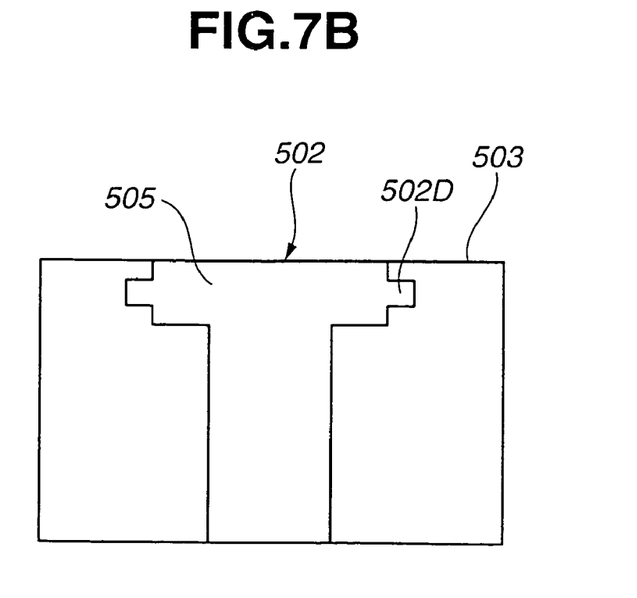

FIG. 7B illustrates a modification of the fourth embodiment in which projection 502D is provided on opposed side surfaces of the head portion of stator core 502. Projection 502D continuously extends in the direction of central axis C of the stator between opposite axial end surfaces of stator core 502. Projection 502D forms the meshing portion on the circumferentially opposed side surfaces of stator core 502 which is meshed with molded resin 503 filled between adjacent stator cores 502. Specifically, projections 502D are formed on circumferentially opposed side surfaces of the head portion of respective stator segments 505 laminated in the direction of central axis C. Projections 502D are in alignment with one another in the direction of central axis C. Molded resin 503 filled between adjacent stator cores 502 are formed with a recess meshed with projection 502D of stator core 502.

Owing to the meshing between recess 402C of stator core 402 and the projection of molded resin 403 in the fourth embodiment and the meshing between projection 502D of stator core 502 and the recess of molded resin 503 in the modification thereof, stator cores 402 and 502 can be radially fixed and prevented from being radially displaced relative to molded resins 403 and 503. Further, the provision of recess 402C in the fourth embodiment serves for reducing leakage flux as compared to projection 502D in the modification thereof. Further, since the circumferential width of the head portion of respective stator cores 402 and 502 is larger than that of the shank portion thereof, the influence upon a size of the magnetic path in the fourth embodiment and the modification thereof is less than that in the third embodiment and the modification thereof in which recess 202A and projection 302B are formed on the shank portion as shown in FIGS. 6A and 6B.

Figure 8:
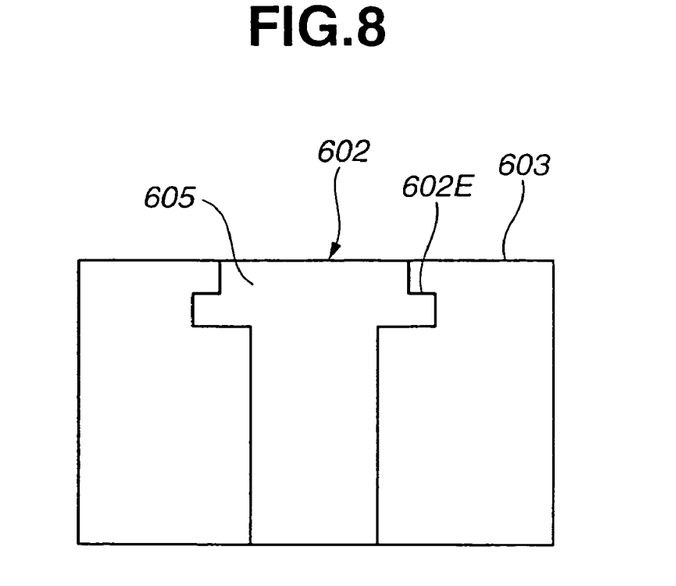
FIG. 8 illustrates a fifth embodiment of the stator of the present invention.

Referring to FIG. 8, a fifth embodiment of the stator of the present invention is explained, which differs in configuration of the stator core and the molded resin from the first embodiment. FIG. 8 is a schematic cross section of the stator, taken in a plane perpendicular to central axis C, and shows only stator core 602 and molded resin 603 for the sake of simplicity. Stator core 602 having a generally T-shaped section includes a head portion located on the radial outside and a shank portion located on the radial inside and having a circumferential width smaller than that of the head portion. Cutout 602E is formed at corners in which circumferentially opposed side surfaces of the head portion of stator core 602 encounter an outer circumferential surface thereof. Cutout 602E thus forms the meshing portion on the circumferentially opposed side surfaces of stator core 602 which is meshed with molded resin 603 filled between adjacent stator cores 602. Cutout 602E extends in the direction of central axis C of the stator and defines a rectangular cross section of the meshing portion, taken in the plane perpendicular to central axis C. That is, cutouts 602E are formed on circumferentially opposed side surfaces of the head portion of respective stator segments 605 laminated in the direction of central axis C. Cutouts 602E are in alignment with one another in the direction of central axis C. Molded resin 603 filled between adjacent stator cores 602 is formed with a projection meshed with cutout 602E of stator core 602.

Owing to the meshing between cutout 602E of stator core 602 and the projection of molded resin 603 in the fifth embodiment, stator core 602 can be radially fixed and prevented from being radially displaced relative to molded resin 603. Further, in the presence of cutout 602E, an air gap between stator core 602 and the outer rotor is stepwise varied in the vicinity of the circumferentially opposed side surfaces of the head portion of stator core 602. As a result, dispersion in magnetic attraction force produced between the stator and the outer rotor which is caused depending on the rotational position of the outer rotor can be considerably reduced, to thereby suppress the cogging torque which will be caused in the rotary electric machine.

Figure 9:
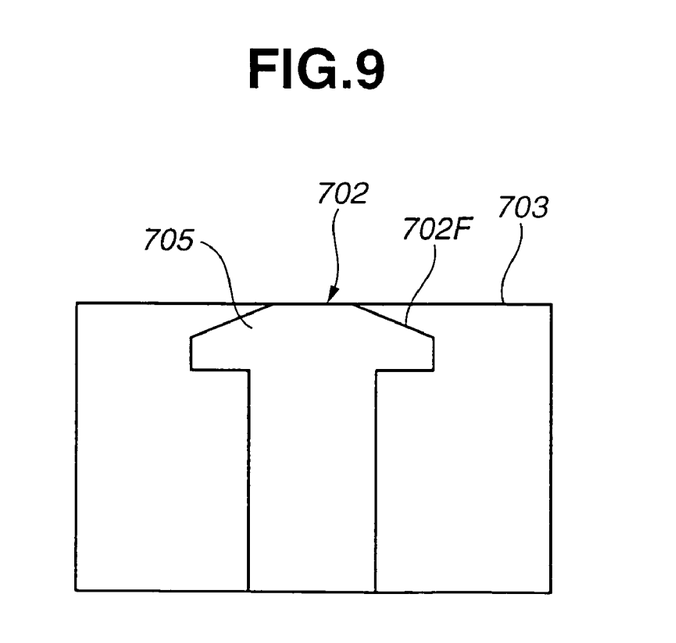
FIG. 9 illustrates a sixth embodiment of the stator of the present invention.

Referring to FIG. 9, a sixth embodiment of the stator of the present invention is explained, which differs in configuration of the cutout from the fifth embodiment. Cutout 702F is formed at corners in which circumferentially opposed side surfaces of the head portion of stator core 702 encounter an outer circumferential surface thereof. Cutout 702F forms the meshing portion on the circumferentially opposed side surfaces of stator core 702 which is meshed with molded resin 703 filled between adjacent stator cores 702. Cutout 702F defines a tapered section of the meshing portion, taken in a plane perpendicular to central axis C. The tapered section is tapered toward the radial inside of stator core 702. Cutout 702F extends in the direction of central axis C of the stator. That is, cutouts 702F are formed on circumferentially opposed side surfaces of the head portion of respective stator segments 705 laminated in the direction of central axis C. Cutouts 702F are in alignment with one another in the direction of central axis C. Molded resin 703 filled between adjacent stator cores 702 is formed with a projection meshed with cutout 702F of stator core 702. Owing to the meshing between cutout 702F of stator core 702 and the projection of molded resin 703, stator core 702 can be radially fixed and prevented from being radially displaced relative to molded resin 703. Further, owing to the formation of cutout 702F, an air gap between stator core 702 and the outer rotor is gradually varied in the vicinity of the circumferentially opposed side surfaces of the head portion of stator core 702. The sixth embodiment, therefore, can exhibit the effect of suppressing the cogging torque which will be caused in the rotary electric machine. Meanwhile, the rotary electric machine to which the stator of the present invention is applied may include both a motor and a generator.

This application is based on prior Japanese Patent Application No. 2004-273379 filed on Sep. 21, 2004. The entire contents of the Japanese Patent Application No. 2004-273379 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotary electric machine, comprising:
   a stator;
   an inner rotor disposed on a radial inside of the stator; and
   an outer rotor disposed on a radial outside of the stator,
   wherein the stator comprises:
      a plurality of stator cores arranged in a circumferentially spaced relation about a central axis of the stator, wherein each of the plurality of stator cores has a T-shape including a shank portion and a head portion, wherein the head portion is located on a radial outside of the stator core; and
      a molded resin filled in the space between adjacent stator cores,
   wherein the adjacent stator cores are spaced from each other and connected with each other through the molded resin filled in the space between the adjacent stator cores,
   wherein each of the plurality of stator cores includes a meshing portion which is meshed with the molded resin,
   wherein the meshing portion comprises a given recess, a given projection, and at least one of a second recess and a second projection alternately formed on each circumferentially opposed side surface of the head portion of the stator core such that the given recess, the given projection, and the one of a second recess and a second projection do not extend to the shank portion, and
   wherein each of the plurality of stator cores includes a plurality of stator segments laminated along a direction of the central axis so as to form the meshing portion.

2. The rotary electric machine as claimed in claim 1, wherein the given recess, the given projection, and the one of a second recess and a second projection comprise part of a plurality of recesses and projections alternately arranged along the direction of the central axis such that the recesses and projections do not extend to the shank portion.

3. The rotary electric machine as claimed in claim 2, wherein each of the plurality of stator cores is formed by two kinds of the stator segments which are different in at least one of shape and size and alternately arranged along the direction of the central axis.

4. The rotary electric machine as claimed in claim 2, wherein the stator segments have a same shape asymmetrical with respect to a straight line extending parallel to a radial direction of each of the plurality of stator cores, the stator segments being arranged to be alternately turned over along the direction of the central axis.

5. The rotary electric machine as claimed in claim 1, wherein the given recess, the given projection, and the one of a second recess and a second projection continuously extend in the direction of the central axis.

6. The rotary electric machine as claimed in claim 5, wherein the one of a second recess and a second projection is the second recess.

7. The rotary electric machine as claimed in claim 5, wherein the one of a second recess and a second projection is the second projection.

8. The rotary electric machine as claimed in claim 5, wherein the given recess is in a the form of a cutout formed between the given and second projections which continuously extend in the direction of the central axis at the circumferentially opposed side surfaces of the head portion.

9. The rotary electric machine as claimed in claim 8, wherein the cutout defines a rectangular section taken in a plane perpendicular to the central axis.

10. The rotary electric machine as claimed in claim 8, wherein the given projection is formed between the given and second recesses which continuously extend in the direction of the central axis at the circumferentially opposed side surfaces of the head portion.

11. The rotary electric machine as claimed in claim 1, wherein each of the plurality of the stator segments is made of an electromagnetic steel plate.

12. The rotary electric machine as claimed in claim 1, wherein the rotary electric machine is a multi-shaft multi-layer rotary electric machine.

13. The rotary electric machine as claimed in claim 1, wherein the molded resin covers at least a portion of end surfaces of the plurality of stator cores.

14. A rotary electric machine, comprising:
a stator;
an inner rotor disposed on a radial inside of the stator; and
an outer rotor disposed on a radial outside of the stator,
wherein the stator comprises:
    a plurality of stator cores arranged in a circumferentially spaced relation about a central axis of the stator, wherein each of the plurality of stator cores has a T-shape including a shank portion and a head portion, wherein the head portion is located on a radial outside of the stator core; and
    a molded resin filled in the space between adjacent stator cores; and
    meshing means for preventing a relative movement between each of the plurality of stator cores and the molded resin in a predetermined direction, the meshing means being disposed on circumferentially opposed side surfaces of the head portion of the stator core,
wherein the adjacent stator cores are spaced from each other and connected with each other through the molded resin filled in the space between the adjacent stator cores and
wherein the meshing means comprises a given recess, a given projection, and at least one of a second recess and a second projection alternately formed on each circumferentially opposed side surface of the head portion of the stator core such that the given recess, the given projection, and the one of a second recess and a second projection do not extend to the shank portion.

15. The rotary electric machine as claimed in claim 14, wherein the predetermined direction is a direction of the central axis of the stator.

16. The rotary electric machine as claimed in claim 14, wherein the predetermined direction is a radial direction of the stator.

17. The rotary electric machine as claimed in claim 14, wherein the molded resin covers at least a portion of end surfaces of the plurality of stator cores.

18. A rotary electric machine, comprising:
a stator;
an inner rotor disposed on a radial inside of the stator; and
an outer rotor disposed on a radial outside of the stator,
wherein the stator comprises:
    a plurality of stator cores arranged in a circumferentially spaced relation about a central axis of the stator, wherein each of the plurality of stator cores has a T-shape including a shank portion and a head portion, wherein the head portion is located on a radial outside of the stator core; and
    a molded resin filled in the space between adjacent stator cores,
wherein the adjacent stator cores are spaced from each other and connected with each other through the molded resin filled in the space between the adjacent stator cores,
wherein each of the plurality of stator cores includes a meshing portion which is meshed with the molded resin and is formed on circumferentially opposed side surfaces of the head portion of the stator core,
wherein the meshing portion comprises recesses and projections alternately arranged along a direction of the central axis such that the recesses and projections do not extend to the shank portion, and
wherein each of the plurality of stator cores includes a plurality of stator segments laminated along the direction of the central axis so as to form the meshing portion.

19. The rotary electric machine as claimed in claim 18, wherein each of the plurality of stator cores is formed by two kinds of the stator segments which are different in at least one of shape and size and alternately arranged along the direction of the central axis.

20. The rotary electric machine as claimed in claim 18, wherein the stator segments have a same shape asymmetrical with respect to a straight line extending parallel to a radial direction of each of the plurality of stator cores, the stator segments being arranged to be alternately turned over along the direction of the central axis.

* * * * *